United States Patent
Kantorova et al.

(10) Patent No.: US 8,645,357 B2
(45) Date of Patent: Feb. 4, 2014

(54) ENTERPRISE HIERARCHY

(75) Inventors: Daniela Kantorova, Belmont, CA (US); John Thuringer, Staines (GB); Neil Ramsay, Madrid (ES); Nigel King, San Mateo, CA (US); Seamus Moran, Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 656 days.

(21) Appl. No.: 12/498,211

(22) Filed: Jul. 6, 2009

(65) Prior Publication Data
US 2011/0004633 A1 Jan. 6, 2011

(51) Int. Cl.
*G06F 7/00* (2006.01)
(52) U.S. Cl.
USPC .................................................. 707/722
(58) Field of Classification Search
USPC ................................................ 707/603, 722
See application file for complete search history.

(56) References Cited

U.S. PATENT DOCUMENTS

| 7,305,419 | B1 * | 12/2007 | Cosby et al. | 1/1 |
| 2007/0192151 | A1 * | 8/2007 | Finley et al. | 705/7 |
| 2010/0083374 | A1 * | 4/2010 | Schmitlin et al. | 726/21 |

* cited by examiner

*Primary Examiner* — Rehana Perveen
*Assistant Examiner* — Hung Havan
(74) *Attorney, Agent, or Firm* — Kilpatrick Townsend & Stockton LLP

(57) ABSTRACT

Techniques implementable in an enterprise application or application suite for managing the organizational structure of an enterprise. In one set of embodiments, a single, unified hierarchy can be defined for the organizational structure of an enterprise. The unified hierarchy can include high-level nodes that correspond to entities common to different manifestations of the organizational structure (e.g., reporting structure, cost structure, etc.). The unified hierarchy can also include lower-level nodes that are unique to a particular manifestation. By defining a single, unified hierarchy in this manner, organizational changes in the enterprise can be modeled in the application/application suite by simply updating the unified hierarchy (rather than updating multiple hierarchies). In addition, the unified hierarchy can be used to facilitate security provisioning and reporting.

20 Claims, 8 Drawing Sheets

ENTERPRISE HIERARCHY

BACKGROUND

The present disclosure relates in general to enterprise management, and in particular to techniques for managing the organizational structure of an enterprise.

Many enterprises use a suite of software applications (referred to herein as "enterprise applications") to manage various aspects of their business affairs. For instance, an enterprise may use a Human Resources (HR) application to manage information and perform administrative functions pertaining to its employees, a Financials application to track its costs and revenues, and so on. By implementing these types of applications, enterprises can improve their operational efficiency, ensure adherence to organization policy, and facilitate the realization of business objectives. Examples of commercially available enterprise application suites include, without limitation, JD Edwards EnterpriseOne, PeopleSoft Enterprise, and the Oracle eBusiness Suite, all available from Oracle Corporation.

In a typical enterprise application suite, the organizational structure of an enterprise is modeled using several different hierarchies. Each hierarchy represents a different manifestation of the organizational structure (e.g., reporting structure, cost structure, etc.). For example, an HR application in the suite may maintain a reporting hierarchy (corresponding to a reporting structure) that identifies business units in the enterprise and reporting relationships between those business units. As another example, a Financials application in the suite may maintain a cost center hierarchy (corresponding to a cost structure) that identifies cost centers in the enterprise (i.e., entities that generate costs or revenues) and cost rollup relationships between those cost centers. From the perspective of the application suite, these hierarchies are unrelated. However, in actuality, the entities included in these hierarchies may overlap to a degree. For instance, a business unit in the reporting hierarchy may have its costs tracked in the general ledger of the enterprise, and therefore correspond to a cost center in the cost center hierarchy.

The maintenance of separate, but overlapping, hierarchies as described above can be problematic when an organizational change occurs in the enterprise. For example, if a change is made to a business unit in the reporting hierarchy that corresponds to a cost center in the cost center hierarchy, both the reporting and cost center hierarchies must be updated to properly reflect the change. Similarly, if other hierarchies maintained by the application suite are affected by the organizational change, they must also be updated accordingly. The need to update multiple hierarchies in this manner can be cumbersome, time consuming, and error-prone.

BRIEF SUMMARY

Embodiments of the present invention provide techniques that are implementable in an enterprise application or application suite for managing the organizational structure of an enterprise. In one set of embodiments, a single, unified hierarchy can be defined for the organizational structure of an enterprise. The unified hierarchy can include high-level nodes that correspond to entities common to different manifestations of the organizational structure (e.g., reporting structure, cost structure, etc.). The unified hierarchy can also include lower-level nodes that are unique to a particular manifestation. By defining a single, unified hierarchy in this manner, organizational changes in the enterprise can be modeled in the application/application suite by simply updating the unified hierarchy (rather than updating multiple hierarchies). In addition, the unified hierarchy can be used to facilitate security provisioning and reporting.

According to one embodiment of the present invention, a method for managing the organizational structure of an enterprise is provided. The method comprises storing, by a computer system, a hierarchy for an enterprise, where the hierarchy includes a first set of nodes, each node in the first set being associated with an entity in a reporting structure of the enterprise; a second set of nodes distinct from the first set, each node in the second set being associated with an entity in a cost structure of the enterprise; and a third set of nodes distinct from the first and second sets, each node in the third set being associated with both an entity in the reporting structure and an entity in the cost structure. The method further comprises generating, by the computer system, a visual representation of the hierarchy for display to a user, and allowing, by the computer system, the user to make modifications to the first set, the second set, or the third set based on a role assigned to the user.

In one embodiment, the user is allowed to make modifications to the first set if the role assigned to the user indicates that the user can modify the reporting structure of the enterprise. In another embodiment, the user is allowed to make modifications to the second set if the role assigned to the user indicates that the user can modify the cost structure of the enterprise. In yet another embodiment, the user is allowed to make modifications to the third set if the role assigned to the user indicates that the user can modify a departmental structure of the enterprise.

In one embodiment, making modifications to the first set, the second set, or the third set comprises adding or deleting a node in the first set, the second set, or the third set. In another embodiment, making modifications to the first set, the second set, or the third set comprises moving a node in the first set, the second set, or the third set from a first position in the hierarchy to a second position in the hierarchy. In some embodiments, when the node is moved from the first position to the second position, all nodes that are children of the node in the hierarchy are automatically moved with the node.

In one embodiment, the method above further comprises provisioning security privileges to one or more employees in the enterprise based on a change in the hierarchy.

In one embodiment, the method above further comprises storing a first version of the hierarchy at a first point in time, storing a second version of the hierarchy at a second point in time, and generating a report describing a change in one or more nodes in the hierarchy between the first version and the second version.

In one embodiment, the hierarchy further includes a fourth set of nodes distinct from the first, second, and third sets, each node in the fourth set being associated with an entity in a sales structure of the enterprise, where the method further comprises allowing the user to make modifications to the fourth set based on the role assigned to the user. In some embodiments, the user is allowed to make modifications to the fourth set if the role assigned to the user indicates that the user can modify the sales structure of the enterprise.

According to another embodiment of the present invention, a machine-readable storage medium having stored thereon program code executable by a computer system is provided. The program code comprises code that causes the computer system to store a hierarchy for an enterprise, the hierarchy including a first set of nodes, each node in the first set being associated with an entity in a reporting structure of the enterprise; a second set of nodes distinct from the first set, each node in the second set being associated with an entity in a cost structure of the enterprise; and a third set of nodes distinct from the first and second sets, each node in the third set being associated with both an entity in the reporting structure and an entity in the cost structure. The program code further comprises code that causes the computer system to generate a visual representation of the hierarchy for display to a user, and code that causes the computer system to allow the user to make modifications to the first set, the second set, or the third set based on a role assigned to the user.

According to another embodiment of the present invention, a system for managing the organizational structure of an enterprise is provided. The system comprises a storage component configured to store a hierarchy for an enterprise, the hierarchy including a first set of nodes, each node in the first set being associated with an entity in a reporting structure of the enterprise; a second set of nodes distinct from the first set, each node in the second set being associated with an entity in a cost structure of the enterprise; and a third set of nodes distinct from the first and second sets, each node in the third set being associated with both an entity in the reporting structure and an entity in the cost structure. The system further comprises a processing component in communication with the storage component, the processing component being configured to generate a visual representation of the hierarchy for display to a user and to allow the user to make modifications to the first set, the second set, or the third set based on a role assigned to the user.

A further understanding of the nature and advantages of the embodiments disclosed herein can be realized by reference to the remaining portions of the specification and the attached drawings.

DETAILED DESCRIPTION

In the following description, for the purposes of explanation, numerous details are set forth in order to provide an understanding of various embodiments of the present invention. It will be apparent, however, to one skilled in the art that certain embodiments can be practiced without some of these details.

Embodiments of the present invention provide techniques that are implementable in an enterprise application or application suite for managing the organizational structure of an enterprise. In one set of embodiments, a single, unified hierarchy can be defined for the organizational structure of an enterprise. The unified hierarchy can include high-level nodes that correspond to entities common to different manifestations of the organizational structure (e.g., reporting structure, cost structure, etc.). The unified hierarchy can also include lower-level nodes that are unique to a particular manifestation. By defining a single, unified hierarchy in this manner, organizational changes in the enterprise can be modeled in the application/application suite by simply updating the unified hierarchy (rather than updating multiple hierarchies). In addition, the unified hierarchy can be used to facilitate security provisioning and reporting.

Figure 1:
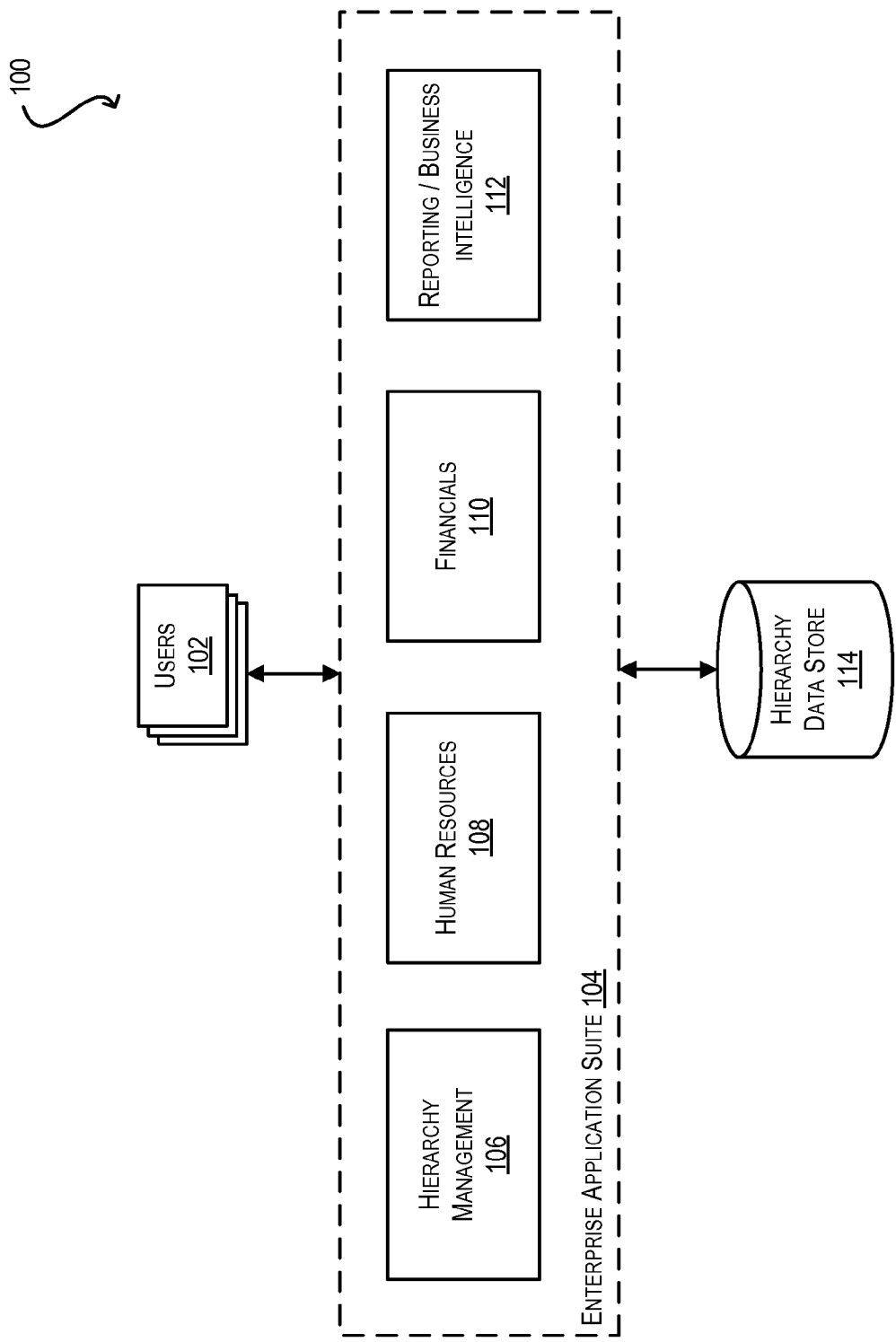
FIG. 1 is a simplified block diagram of a system according to an embodiment of the present invention.

FIG. 1 is a simplified block diagram of a system 100 according to an embodiment of the present invention. As shown, system 100 can include a plurality of users 102 interacting with an enterprise application suite 104. Application suite 104 can include various enterprise applications, such as a hierarchy management application 106, a human resources application 108, a financials application 110, and a reporting/business intelligence application 112.

In one set of embodiments, hierarchy management application 106 can enable a user 102 to define and maintain a single, unified hierarchy that represents the organizational structure of an enterprise. As described above, the organizational structure of an enterprise can be manifested in a number of different ways, such as a manifestation for reporting purposes (i.e., a reporting structure), a manifestation for costing purposes (i.e., a cost structure), a manifestation for sales territory allocation purposes (i.e., a sales structure), and the like. These different manifestations can overlap to a certain degree. In various embodiments, the unified hierarchy created via hierarchy management application 106 can simultaneously model all of these different manifestations.

For instance, assume that an enterprise has (1) a reporting structure comprising business units in the enterprise and reporting relationships between the business units; and (2) a cost structure comprising cost centers in the enterprise and cost rollup relationships between the cost centers. Further, assume that certain entities in the reporting structure overlap with certain entities in the cost structure (e.g., a business unit in the reporting structure has its costs tracked by a cost center in the cost structure). In this case, the unified hierarchy created by hierarchy management application 106 can include (1) a node for each entity that is specific to the reporting structure (referred to herein as a "workgroup" node), (2) a node for each entity that is specific to the cost structure (referred to herein as a "cost center" node), and (3) a node for each entity that is common between the reporting and cost structures (referred to herein as a "department" node). Further, the various nodes can be organized such that their relative relationships in the reporting and cost structures are maintained. In this manner, the reporting and cost structures of the enterprise can be represented using the single, unified hierarchy, rather than multiple, distinct hierarchies as in the prior art. A detailed example of a reporting structure, a cost structure, and a unified hierarchy based on the reporting and cost structures are discussed with respect to FIGS. 2-4 below.

One benefit with maintaining a unified hierarchy as described above is that organizational changes in the enterprise can be accounted for by simply modifying the unified hierarchy. Since the unified hierarchy can simultaneously model all of the various manifestations of the enterprise's organizational structure, all of these manifestations can be automatically updated. For example, in response to a departmental reorganization, a user 102 can move a department node from one location in the unified hierarchy to another location in the unified hierarchy. When the department node is moved, any department, workgroup, and/or cost center nodes underneath the department node can be automatically moved with it. Accordingly, the reporting structure and the cost structure of the enterprise can be automatically changed.

In one set of embodiments, access to view and/or modify the unified hierarchy via hierarchy management application 106 can be controlled by roles associated with users 102. This access control mechanism can be granular, such that access is allowed or disallowed for specific sub-trees or nodes in the hierarchy. For example, a first group of users can be allowed to view and/or modify workgroup nodes in the hierarchy if the first group of users are associated with roles allowing them to view and/or modify the reporting structure of the enterprise. As another example, a second group of users can be allowed to view and/or modify cost center nodes in the hierarchy if the second group of users are associated with roles allowing them to view and/or modify the cost structure of the enterprise. As yet another example, a third group of users can be allowed to view and/or modify department nodes in the hierarchy if the third group of users are associated with roles allowing then to view and/or modify a departmental structure of the enterprise. In this manner, hierarchy management application 106 can ensure that each user 102 only views or modifies the portions of the unified hierarchy that is appropriate for his/her role in the enterprise.

In one set of embodiments, the unified hierarchy maintained via hierarchy management application 106 can be stored in a data store such as hierarchy data store 114. This stored representation can then be made available to other applications in application suite 104 (such as human resources application 108 and financial application 110) for various purposes. For instance, human resources application 108 can access the hierarchy to determine information about the current reporting structure of the enterprise. Similarly, financials application 110 can access the hierarchy to determine information about the current cost structure of the enterprise. This sharing of a single, unified hierarchy obviates the need for different applications to maintain separate, but overlapping, hierarchies as in the prior art.

In certain embodiments, the unified hierarchy described above can be used to facilitate the provisioning of security privileges within application suite 104. For example, if a manager is authorized to a business unit that is a department node in the unified hierarchy, the manager can be automatically authorized to perform application tasks with respect to departments, workgroups, or cost centers underneath that business unit in the hierarchy. These security privileges can be automatically provisioned and revoked as the organizational structure of the enterprise (and thus the unified hierarchy) changes.

In another set of embodiments, the unified hierarchy described above can be used to facilitate reporting within application suite 104. In the prior art, it was difficult to generate reports about the organizational structure of an enterprise because information about that structure was split among multiple, distinct hierarchies. With a single, unified hierarchy, a reporting application (such as reporting/business intelligence application 112) can access a complete and centralized view of the enterprise's organization structure and generate reports accordingly. For example, in one embodiment, reporting/business intelligence application 112 can maintain multiple versions of the unified hierarchy and generate reports indicating how specific nodes in the hierarchy change over time. This process is described in greater detail with respect to FIG. 7 below.

It should be appreciated that FIG. 1 is illustrative and not intended to limit embodiments of the present invention. For example, application suite 104 may include other applications and/or components that are not specifically described. One of ordinary skill in the art will recognize many variations, modifications, and alternatives.

Figure 2:
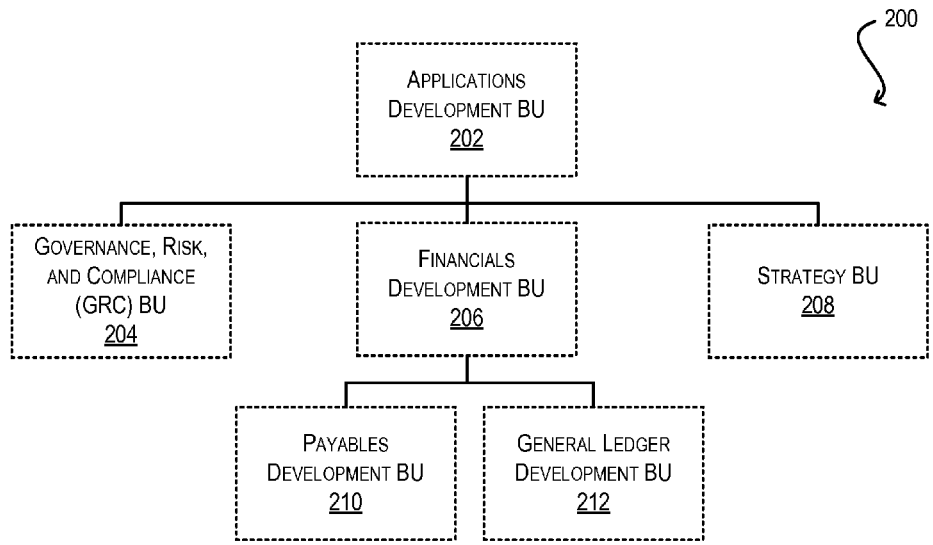
FIG. 2 illustrates a reporting structure for an enterprise.
Figure 3:
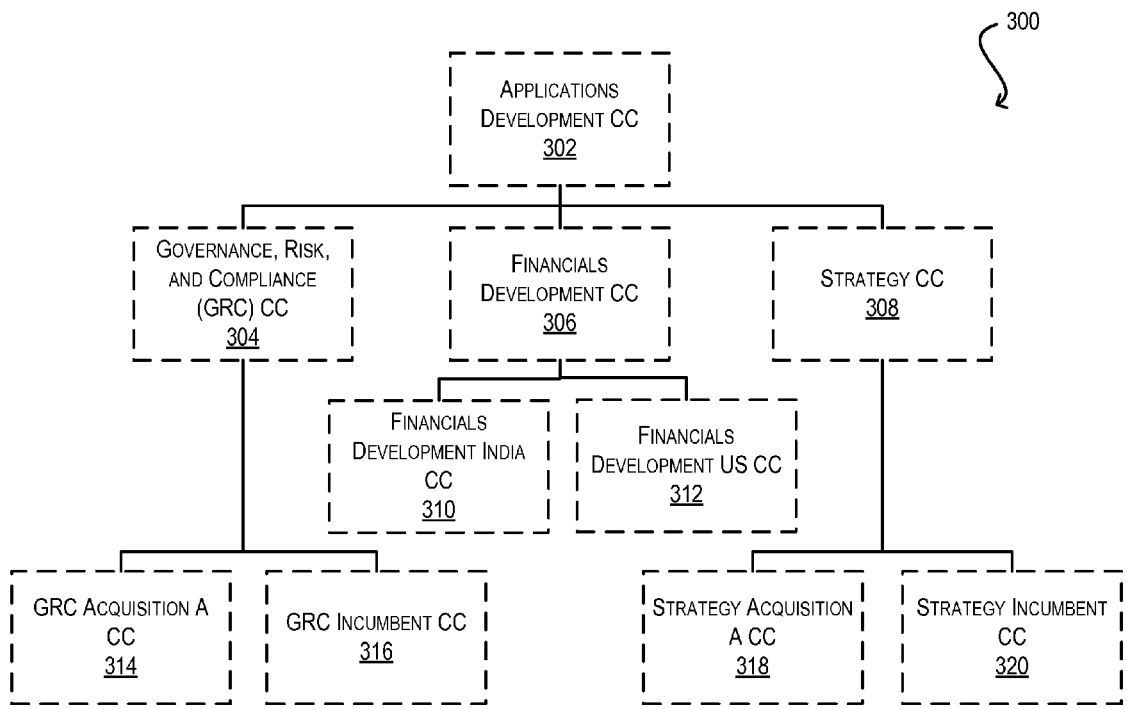
FIG. 3 illustrates a cost structure for an enterprise.

FIGS. 2 and 3 illustrate an example reporting structure 200 and an example cost structure 300 for an enterprise. As shown, reporting structure 200 includes a number of business units (202-212) and reporting relationships between those business units. Cost structure 300 includes a number of cost centers (302-320) and cost rollup relationships between those cost centers. Certain entities in reporting structure 200 and cost structure 300 overlap; for example, Applications Development business unit (BU) 202 corresponds to Applications Development cost center (CC) 302, GRC BU 204 corresponds to GRC CC 304, Financials Development BU 206 corresponds to Financials Development CC 306, and Strategy BU 208 corresponds to Strategy CC 308.

In addition, certain entities are unique to reporting structure 200 (210, 212) and certain entities are unique to cost structure 300 (310-320). For example, Payables Development BU 210 is unique to reporting structure 200 because it does not have its costs separately tracked (and therefore does not having a corresponding cost center in cost structure 300). As another example, GRC Acquisition A CC 314 is unique to cost structure 300 because it is solely designed to track acquisition costs (and therefore does not have a corresponding business unit in reporting structure 200).

Figure 4:
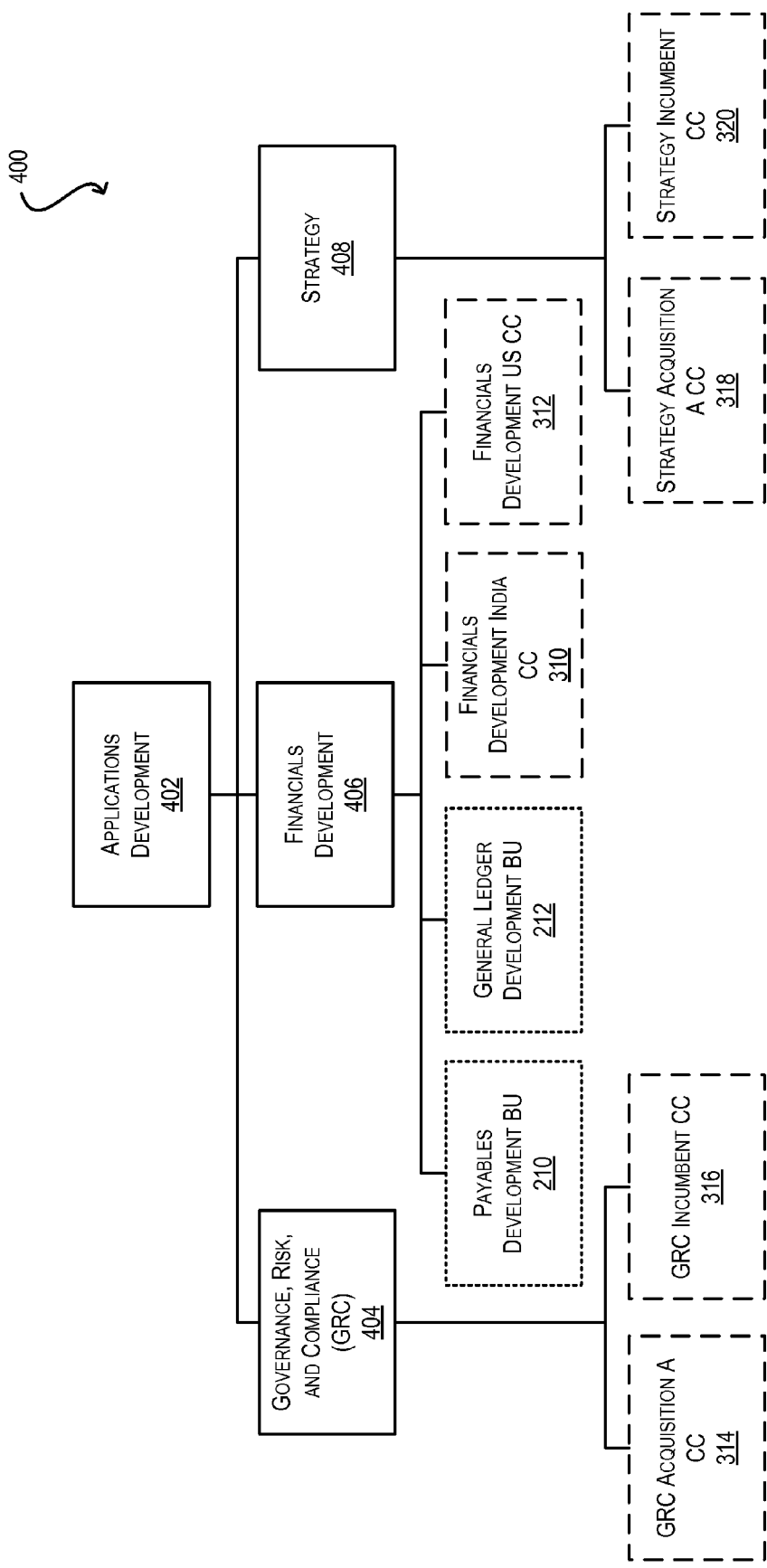
FIG. 4 illustrates a unified hierarchy according to an embodiment of the present invention.

FIG. 4 illustrates a unified hierarchy 400 for an enterprise according to an embodiment of the present invention. In particular, hierarchy 400 represents a hierarchy that may be defined via hierarchy management application 106 based on reporting structure 200 of FIG. 2 and cost structure 300 of FIG. 3.

As shown, hierarchy 400 includes a number of high-level nodes 402-408. These high-level nodes, referred to as departments, correspond to entities that are common between reporting structure 200 and cost structure 300. For example, Application Development department 402 corresponds to Applications Development BU 202 and Applications Development CC 302, GRC department 404 corresponds to GRC BU 204 and GRC CC 304, Financials Development department 406 corresponds to Financials Development BU 206 and Financials Development CC 306, and Strategy department 408 corresponds to Strategy BU 208 and Strategy CC 308.

Hierarchy 400 also includes a number of lower-level nodes 210, 212, 310-320. These lower-level nodes map to the nodes that are specific to reporting structure 200 and cost structure 300 respectively. The nodes specific to reporting structure 200 (nodes 210, 212) are referred to as workgroups. The nodes specific to cost structure 300 (nodes 310-32) are referred to as cost centers. As can be seen, nodes 210, 212, 310-320 are organized such that the relative relationships between the nodes in structures 200 and 300 are maintained. For example, GRC Acquisition A CC 314 and GRC Acquisition B CC 316 are located beneath GRC department 404 (which corresponds to GRC CC 304 of FIG. 3), Payables Development BU 210 and General Ledger Development BU 212 are located beneath Financials Development 406 (which corresponds to Financials Development BU 206 of FIG. 2), etc. In this manner, unified hierarchy 400 can model all of the entities and relationships depicted in FIGS. 2 and 3 in a single data structure.

Figure 5:
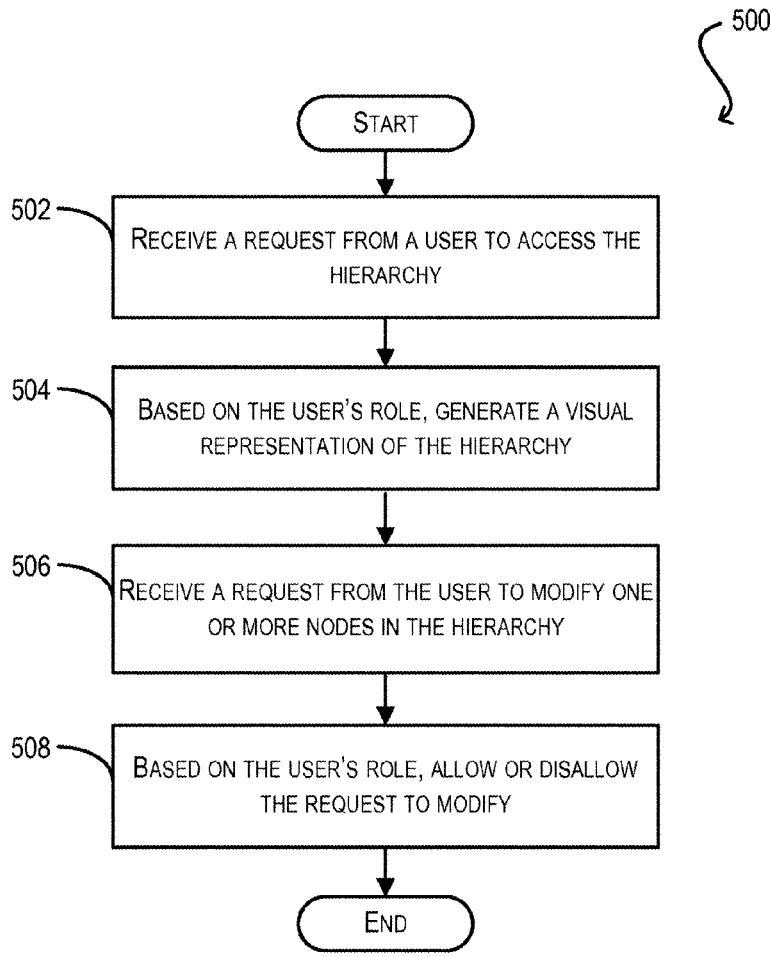
FIG. 5 is a flow diagram of a process for accessing and modifying a unified hierarchy according to an embodiment of the present invention.

FIG. 5 is a flow diagram of a process 500 for accessing and modifying a unified hierarchy according to an embodiment of the present invention. In one set of embodiments, process 500 can be carried out by hierarchy management application 106 of FIG. 1. Process 500 can be implemented in hardware, software, or a combination thereof. As software, process 500 can be encoded as program code stored on a machine-readable storage medium.

At block 502, a request can be received from a user (e.g., user 102 of FIG. 1) to access the unified hierarchy. In response to the request, a role for the user can be determined and a visual representation of the hierarchy can be generated based on the role (block 504). For example, if the user is an HR manager with an appropriate role to view the reporting structure of the enterprise, the visual representation generated at block 504 can include all of the department and workgroup nodes in the unified hierarchy. As another example, if the user is a cost center administrator with an appropriate role to view the cost structure of the enterprise, the visual representation generated at block 504 can include all of the department and cost center nodes in the unified hierarchy. As yet another example, if the user is an enterprise planning manager with an appropriate role to view the entire organizational structure of the enterprise, the visual representation generated at block 504 can include all of the nodes (department nodes and nodes specific to various manifestations) in the unified hierarchy.

At block 506, a request can be received from the user to modify an aspect of the hierarchy. For instance, the request can correspond to a request to delete a node, add a new node, or move an existing node from one location to another. In response, the request to modify can be allowed or disallowed based on the user's role (block 508). Accordingly, the user can be limited to modifying only those portions of the unified hierarchy that are appropriate for his/her role in the enterprise.

It will be appreciated that process 500 is illustrative and that variations and modifications are possible. Steps described as sequential may be executed in parallel, order of steps may be varied, and steps may be modified, combined, added, or omitted. One of ordinary skill in the art will recognize many variations, modifications, and alternatives.

Figure 6:
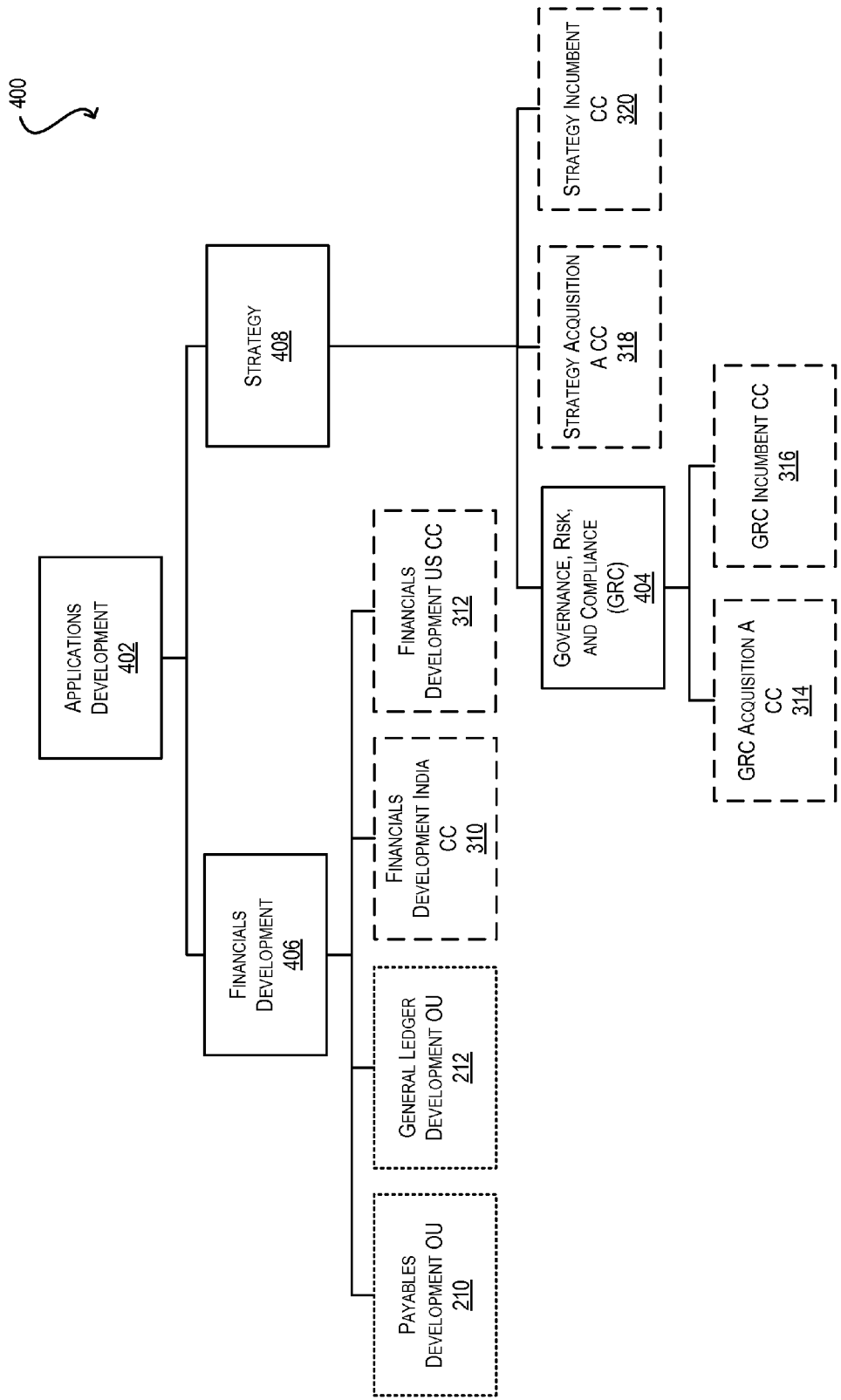
FIG. 6 illustrates a modified version of the unified hierarchy of FIG. 4 according to an embodiment of the present invention.

As described above, one benefit with maintaining a unified hierarchy such as hierarchy 400 of FIG. 4 is that organizational changes in the enterprise can be accounted for by simply modifying the unified hierarchy. Since the unified hierarchy can simultaneously model all of the various manifestations of the enterprise's organizational structure, all of these manifestations can be automatically updated. FIG. 6 illustrates hierarchy 400 after it has been modified per process 500 as result of an enterprise reorganization. As shown, GRC department 404 has been moved under Strategy department 408. By moving GRC department 404, all of the nodes beneath 404 (e.g., cost centers 314, 316) have been moved with it. Thus, both the reporting structure and the cost structure of the enterprise are automatically updated.

Another benefit with maintaining a unified hierarchy is that application security can be automatically provisioned based on changes to the hierarchy. For example, with respect to the reorganization depicted in FIG. 6, managers or other employees in Strategy department 408 can be automatically given security privileges to perform various application tasks (e.g., view headcount, budget, requisitions, expenses reports, etc.) associated with GRC department 404 (and its children nodes). Accordingly, the management of security privileges during an enterprise reorganization can be significantly simplified.

Figure 7:
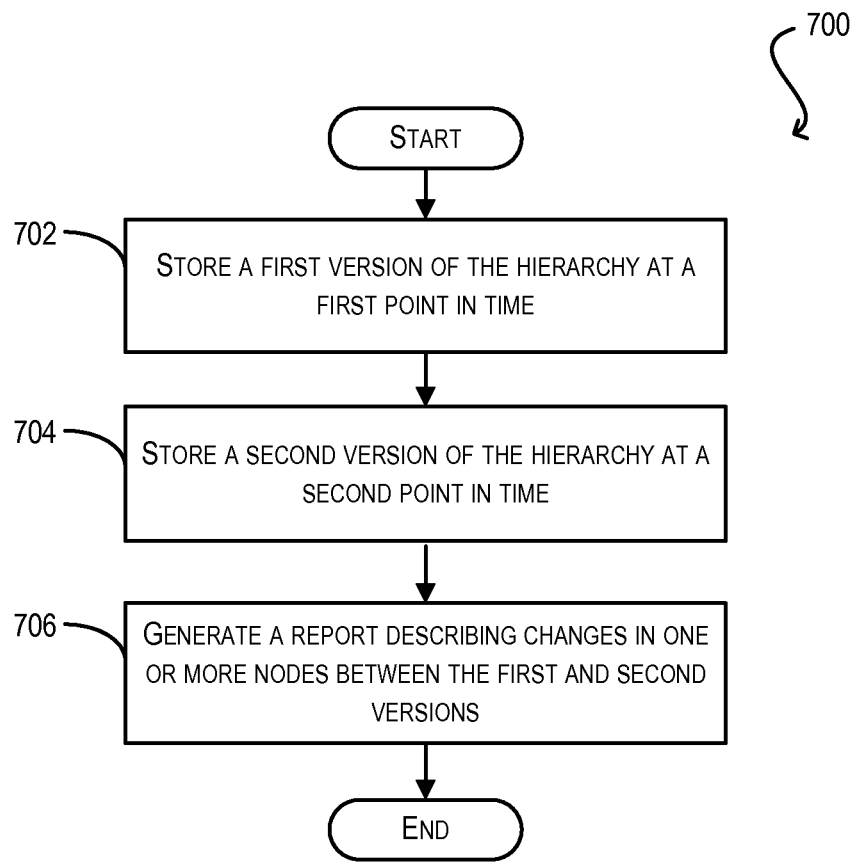
FIG. 7 is a flow diagram of a process for generating a report based on a unified hierarchy according to an embodiment of the present invention.

In certain embodiments, the unified hierarchy described above can be used to facilitate reporting within application suite 104 of FIG. 1. FIG. 7 is a flow diagram of a process 700 for generating a report indicating how the organizational structure of an enterprise can change over time. In one set of embodiments, process 700 can be carried out by reporting/business intelligence application 112 of FIG. 1. Process 700 can be implemented in hardware, software, or a combination thereof. As software, process 700 can be encoded as program code stored on a machine-readable storage medium.

At blocks 702 and 704, first and second versions of the unified hierarchy can be stored, each version representing a state of the hierarchy at a different point in time. For example, the various versions can be stored quarterly or at some other predefined time interval. At block 706, a report can be generated indicating how one or more nodes in the hierarchy have changed between the first and second versions. For instance, with respect to the overall structure of the enterprise, the report can indicate whether certain departments have been cut, added, or moved from one location to another. With respect to the reporting structure of the enterprise, the report can indicate how headcounts have changed in specific departments or workgroups. And with respect to the cost structure of the enterprise, the report can indicate how costs, revenues, and/or budgets have changed for specific cost centers.

It will be appreciated that process 700 is illustrative and that variations and modifications are possible. Steps described as sequential may be executed in parallel, order of steps may be varied, and steps may be modified, combined, added, or omitted. One of ordinary skill in the art will recognize many variations, modifications, and alternatives.

Figure 8:
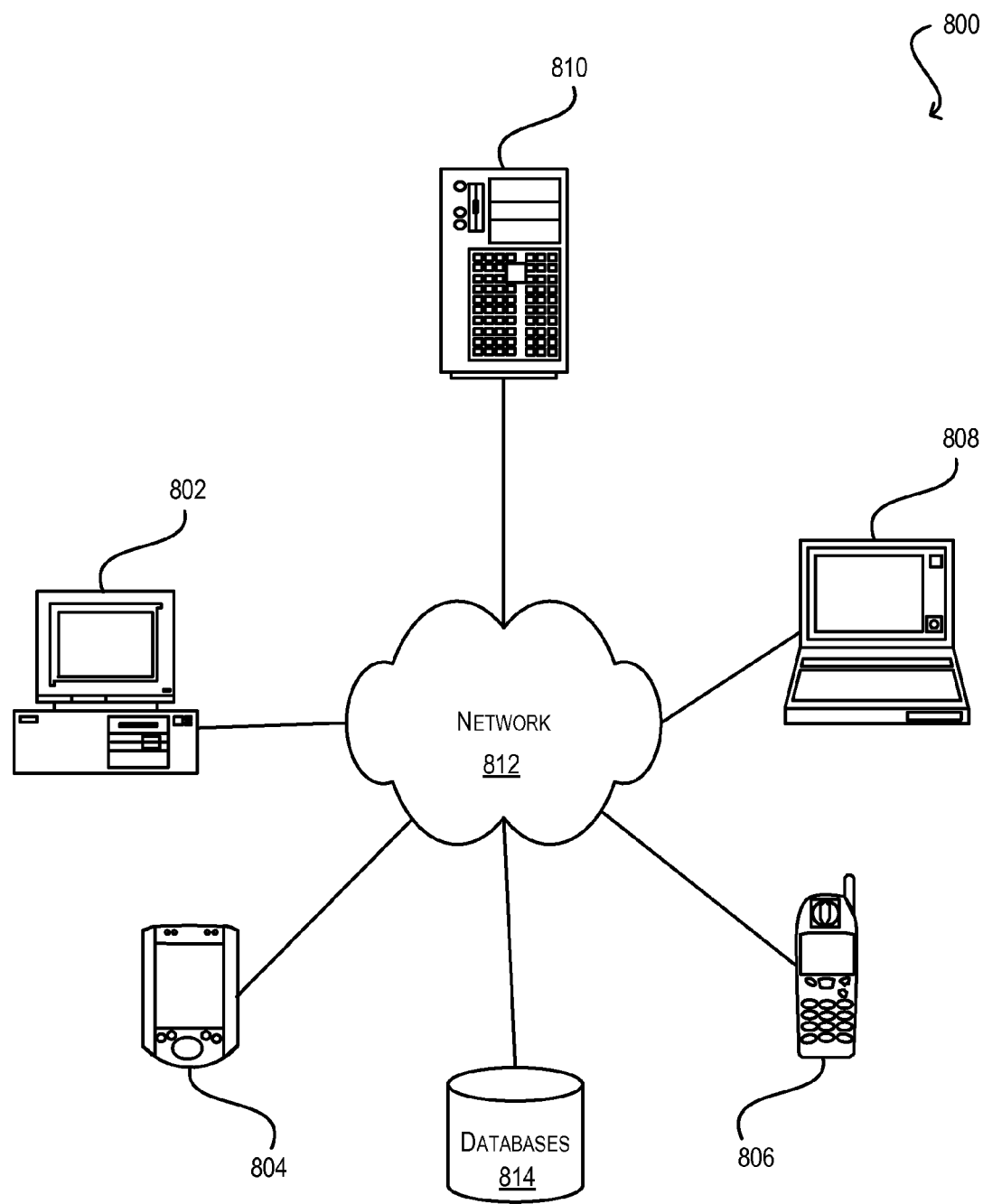
FIG. 8 is a simplified block diagram of a system environment that may be used in accordance with an embodiment of the present invention.

FIG. 8 is a simplified block diagram illustrating a system environment 800 that may be used in accordance with an embodiment of the present invention. As shown, system environment 800 includes one or more client computing devices 802, 804, 806, 808 communicatively coupled with a server computer 810 via a network 812. In one set of embodiments, client computing devices 802, 804, 806, 808 may be used by users 102 of FIG. 1 and be configured to run one or more client applications that interact with enterprise application suite 104. Further, server computer 810 may correspond to a machine configured to run application suite 104. Although system environment 800 is shown with four client computing devices and one server computer, any number of client computing devices and server computers may be supported.

Client computing devices 802, 804, 806, 808 may be general purpose personal computers (including, for example, personal computers and/or laptop computers running various versions of Microsoft Windows and/or Apple Macintosh operating systems), cell phones or PDAs (running software such as Microsoft Windows Mobile and being Internet, e-mail, SMS, Blackberry, and/or other communication protocol enabled), and/or workstation computers running any of a variety of commercially-available UNIX or UNIX-like operating systems (including without limitation the variety of GNU/Linux operating systems). Alternatively, client computing devices 802, 804, 806, 808 may be any other electronic device capable of communicating over a network (e.g., network 812 described below) with server computer 810.

Server computer 810 may be a general purpose computer, specialized server computer (including, e.g., a LINUX server, UNIX server, mid-range server, mainframe computer, rack-mounted server, etc.), server farm, server cluster, or any other appropriate arrangement and/or combination. Server computer 810 may run an operating system including any of those discussed above, as well as any commercially available server operating system. Server computer 810 may also run any of a variety of server applications and/or mid-tier applications, including web servers, Java virtual machines, application servers, database servers, and the like. As indicated above, in one set of embodiments, server computer 810 is adapted to run one or more applications such as enterprise application suite 104 of FIG. 1.

As shown, client computing devices 802, 804, 806, 808 and server computer 810 are communicatively coupled via network 812. Network 812 may be any type of network that can support data communications using any of a variety of commercially-available protocols, including without limitation TCP/IP, SNA, IPX, AppleTalk, and the like. Merely by way of example, network 812 may be a local area network (LAN), such as an Ethernet network, a Token-Ring network and/or the like; a wide-area network; a virtual network, including without limitation a virtual private network (VPN); the Internet; an intranet; an extranet; a public switched telephone network (PSTN); an infra-red network; a wireless network (e.g., a network operating under any of the IEEE 802.11 suite of protocols, the Bluetooth protocol known in the art, and/or any other wireless protocol); and/or any combination of these and/or other networks.

System environment 800 may also include one or more databases 814. In one set of embodiments, database 814 can include any other database or data storage component discussed in the foregoing disclosure, such as hierarchy data store 114 of FIG. 1. Database 814 may reside in a variety of locations. By way of example, database 814 may reside on a storage medium local to (and/or resident in) one or more of the computers 802, 804, 806, 808, 810. Alternatively, database 814 may be remote from any or all of the computers 802, 804, 806, 808, 810 and/or in communication (e.g., via network 812) with one or more of these. In one set of embodiments, database 814 may reside in a storage-area network (SAN) familiar to those skilled in the art. Similarly, any necessary files for performing the functions attributed to the computers 802, 804, 806, 808, 810 may be stored locally on the respective computer and/or remotely on database 814, as appropriate. In one set of embodiments, database 814 is a relational database, such as Oracle 10g available from Oracle Corporation. In a particular embodiment, database 814 is adapted to process SQL-formatted commands received from applications in suite 104.

Figure 9:
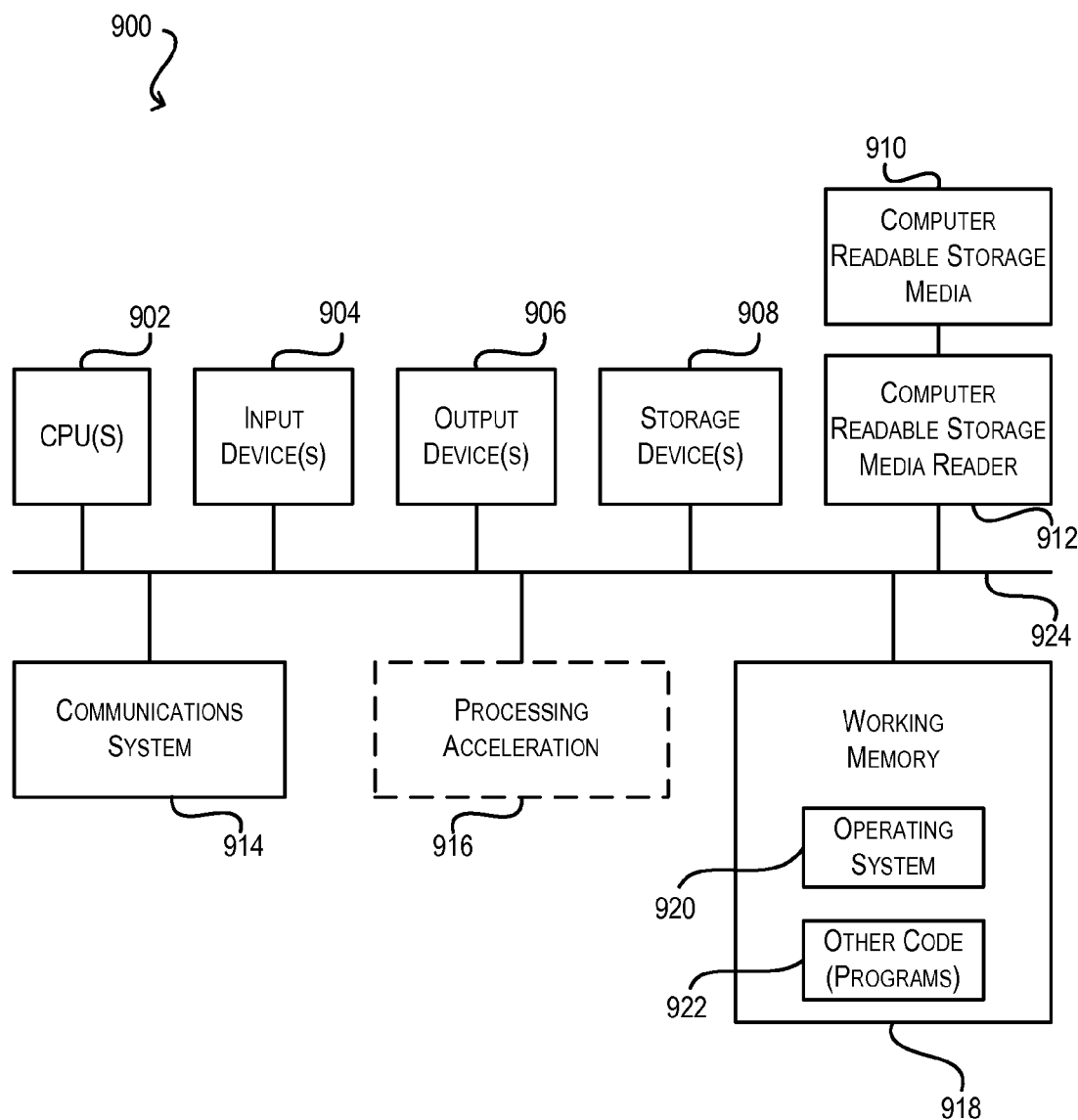
FIG. 9 is a simplified block diagram of a computer system that may be used in accordance with an embodiment of the present invention.

FIG. 9 is a simplified block diagram illustrating physical components of a computer system 900 that may incorporate an embodiment of the present invention. In various embodiments, computer system 900 may be used to implement any of the computers 802, 804, 806, 808, 810 illustrated in system environment 800 described above. As shown in FIG. 9, computer system 900 comprises hardware elements that may be electrically coupled via a bus 924. The hardware elements may include one or more central processing units (CPUs) 902, one or more input devices 904 (e.g., a mouse, a keyboard, etc.), and one or more output devices 906 (e.g., a display device, a printer, etc.). Computer system 900 may also include one or more storage devices 908. By way of example, storage device(s) 908 may include devices such as disk drives, optical storage devices, and solid-state storage devices such as a random access memory (RAM) and/or a read-only memory (ROM), which can be programmable, flash-updateable and/or the like.

Computer system 900 may additionally include a computer-readable storage media reader 912, a communications subsystem 914 (e.g., a modem, a network card (wireless or wired), an infra-red communication device, etc.), and working memory 918, which may include RAM and ROM devices as described above. In some embodiments, computer system 900 may also include a processing acceleration unit 916, which can include a digital signal processor (DSP), a special-purpose processor, and/or the like.

Computer-readable storage media reader 912 can further be connected to a computer-readable storage medium 910, together (and, optionally, in combination with storage device(s) 908) comprehensively representing remote, local, fixed, and/or removable storage devices plus storage media for temporarily and/or more permanently containing computer-readable information. Communications system 914 may permit data to be exchanged with network 812 of FIG. 8 and/or any other computer described above with respect to system environment 800.

Computer system 900 may also comprise software elements, shown as being currently located within working memory 918, including an operating system 920 and/or other code 922, such as an application program (which may be a client application, Web browser, mid-tier application, RDBMS, etc.). It should be appreciated that alternative embodiments of computer system 900 may have numerous variations from that described above. For example, customized hardware might also be used and/or particular elements might be implemented in hardware, software (including portable software, such as applets), or both. Further, connection to other computing devices such as network input/output devices may be employed.

In one set of embodiments, the techniques described herein may be implemented as program code executable by a computer system (such as a computer system 900) and may be stored on machine-readable storage media. Machine-readable storage media may can include any appropriate media known or used in the art, including storage media and communication media, such as (but not limited to) volatile and non-volatile, removable and non-removable media implemented in any method or technology for storage and/or transmission of information such as machine-readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store or transmit the desired information and which can be accessed by a computer.

Although specific embodiments of the present invention have been described, various modifications, alterations, alternative constructions, and equivalents are within the scope of the invention. For example, embodiments of the present invention are not restricted to operation within certain specific data processing environments, but are free to operate within a plurality of data processing environments. Additionally, although embodiments of the present invention have been described using a particular series of transactions and steps, it should be apparent to those skilled in the art that the scope of the present invention is not limited to the described series of transactions and steps.

Further, while embodiments of the present invention have been described using a particular combination of hardware and software, it should be recognized that other combinations of hardware and software are also within the scope of the present invention. Embodiments of the present invention may be implemented only in hardware, or only in software, or using combinations thereof.

The specification and drawings are, accordingly, to be regarded in an illustrative rather than a restrictive sense. The scope of the invention should be determined not with reference to the above description, but instead should be determined with reference to the pending claims along with their full scope or equivalents.

What is claimed is:

1. A method comprising:
    storing, by a computer system, a unified hierarchy for an enterprise, the unified hierarchy including:
        a first set of nodes, each node in the first set representing a node in a reporting structure hierarchy of the enterprise;
        a second set of nodes distinct from the first set, each node in the second set representing a node in a cost structure hierarchy of the enterprise; and
        a third set of nodes distinct from the first and second sets, each node in the third set representing, as a single node, distinct nodes in the reporting structure hierarchy and the cost structure hierarchy respectively, wherein the unified hierarchy is configured to represent a hierarchy that combines the reporting structure hierarchy and the cost structure hierarchy together with nodes common to the reporting structure hierarchy and the cost structure hierarchy are collapsed into a single node within the third set of nodes, and nodes that are unique to the reporting structure hierarchy and the cost structure hierarchy are carried over into the unified hierarchy unmodified;
    generating, by the computer system, a visual representation of the unified hierarchy for display to a user; and
    allowing, by the computer system, the user to make modifications to the first set, the second set, or the third set based on a role assigned to the user.

2. The method of claim 1 wherein the user is allowed to make modifications to the first set if the role assigned to the user indicates that the user can modify the reporting structure of the enterprise.

3. The method of claim 1 wherein the user is allowed to make modifications to the second set if the role assigned to the user indicates that the user can modify the cost structure of the enterprise.

4. The method of claim 1 wherein the user is allowed to make modifications to the third set if the role assigned to the user indicates that the user can modify a departmental structure of the enterprise.

5. The method of claim 1 wherein making modifications to the first set, the second set, or the third set comprises adding or deleting a node in the first set, the second set, or the third set.

6. The method of claim 1 wherein making modifications to the first set, the second set, or the third set comprises moving a node in the first set, the second set, or the third set from a first position in the hierarchy to a second position in the hierarchy.

7. The method of claim 6 wherein when the node is moved from the first position to the second position, all nodes that are children of the node in the hierarchy are automatically moved with the node.

8. The method of claim 1 further comprising provisioning security privileges to one or more employees in the enterprise based on a change in the hierarchy.

9. The method of claim 1 further comprising:
    storing a first version of the hierarchy at a first point in time;
    storing a second version of the hierarchy at a second point in time; and
    generating a report describing a change in one or more nodes in the hierarchy between the first version and the second version.

10. The method of claim 1 wherein the hierarchy further includes a fourth set of nodes distinct from the first, second, and third sets, each node in the fourth set representing a node in a sales structure of the enterprise, and wherein the method further comprises allowing the user to make modifications to the fourth set based on the role assigned to the user.

11. The method of claim 10 wherein the user is allowed to make modifications to the fourth set if the role assigned to the user indicates that the user can modify the sales structure of the enterprise.

12. A machine-readable memory device having stored thereon program code:
    which, when executed by a processor, causes the processor to store a unified hierarchy for an enterprise, the unified hierarchy including:
        a first set of nodes, each node in the first set representing a node in a reporting structure hierarchy of the enterprise;
        a second set of nodes distinct from the first set, each node in the second set representing a node in a cost structure hierarchy of the enterprise; and
        a third set of nodes distinct from the first and second sets, each node in the third set representing, as a single node, distinct nodes in the reporting structure hierarchy and the cost structure hierarchy respectively, wherein the unified hierarchy is configured to represent a hierarchy that combines the reporting structure hierarchy and the cost structure hierarchy together with nodes common to the reporting structure hierarchy and the cost structure hierarchy are collapsed into a single node within the third set of nodes, and nodes that are unique to the reporting structure hierarchy and the cost structure hierarchy are carried over into the unified hierarchy unmodified;
    wherein the code further causes the processor to generate a visual representation of the unified hierarchy for display to a user; and
    wherein the code further causes the processor to allow the user to make modifications to the first set, the second set, or the third set based on a role assigned to the user.

13. The machine-readable memory device of claim 12 wherein the user is allowed to make modifications to the first set if the role assigned to the user indicates that the user can modify the reporting structure of the enterprise.

14. The machine-readable memory device of claim 12 wherein the user is allowed to make modifications to the second set if the role assigned to the user indicates that the user can modify the cost structure of the enterprise.

15. The machine-readable memory device of claim 12 wherein the user is allowed to make modifications to the third set if the role assigned to the user indicates that the user can modify a departmental structure of the enterprise.

16. The machine-readable memory device of claim 12 wherein making modifications to the first set, the second set, or the third set comprises moving a node in the first set, the second set, or the third set from a first position in the hierarchy to a second position in the hierarchy.

17. The machine-readable memory device of claim 12 wherein the program code further comprises code that causes the processor to provision security privileges to one or more employees in the enterprise based on a change in the hierarchy.

18. The machine-readable memory device of claim 12 wherein the program code further comprises:
    code that causes the processor to store a first version of the hierarchy at a first point in time;
    code that causes the processor to store a second version of the hierarchy at a second point in time; and
    code that causes the processor to generate a report describing a change in one or more nodes in the hierarchy between the first version and the second version.

19. A system comprising:

a storage device configured to store a unified hierarchy for an enterprise, the unified hierarchy including:

a first set of nodes, each node in the first set representing a node in a reporting structure hierarchy of the enterprise;

a second set of nodes distinct from the first set, each node in the second set representing a node in a cost structure hierarchy of the enterprise; and a third set of nodes distinct from the first and second sets, each node in the third set representing, as a single node, distinct nodes in the reporting structure hierarchy and the cost structure hierarchy respectively, wherein the unified hierarchy is configured to represent a hierarchy that combines the reporting structure hierarchy and the cost structure hierarchy together with nodes common to the reporting structure hierarchy and the cost structure hierarchy are collapsed into a single node within the third set of nodes, and nodes that are unique to the reporting structure hierarchy and the cost structure hierarchy are carried over into the unified hierarchy unmodified; and a central processing unit in communication with the storage device, the central processing unit being configured to:

generate a visual representation of the unified hierarchy for display to a user; and allow the user to make modifications to the first set, the second set, or the third set based on a role assigned to the user.

20. The method of claim 1, wherein relative relationships between nodes in the reporting structure hierarchy and the cost structure hierarchy are maintained in the unified hierarchy which models all of the nodes and relationships from the reporting structure hierarchy and the cost structure hierarchy in a single data structure, without duplicating the nodes that are common to both the reporting structure hierarchy and the cost structure hierarchy.

* * * * *

UNITED STATES PATENT AND TRADEMARK OFFICE
CERTIFICATE OF CORRECTION

| | |
|---|---|
| PATENT NO. | : 8,645,357 B2 |
| APPLICATION NO. | : 12/498211 |
| DATED | : February 4, 2014 |
| INVENTOR(S) | : Kantorova et al. |

It is certified that error appears in the above-identified patent and that said Letters Patent is hereby corrected as shown below:

In the Claims

In column 12, line 8, in Claim 12, delete "code:" and insert -- code --, therefor.

Signed and Sealed this
Fifteenth Day of July, 2014

Michelle K. Lee
*Deputy Director of the United States Patent and Trademark Office*